INVENTORS.
NATHAN J. SIPPEL
HERMAN J. HOFFMAN
BY
ROY MILLER
ATTORNEY.

United States Patent Office 3,362,166
Patented Jan. 9, 1968

3,362,166
BIPROPELLANT ROCKET COMBUSTION CHAMBER
Nathan J. Sippel and Herman J. Hoffman, China Lake, Calif., assignors to the United States of America as represented by the Secretary of the Navy
Filed May 13, 1966, Ser. No. 551,491
4 Claims. (Cl. 60—258)

ABSTRACT OF THE DISCLOSURE

A bipropellant rocket combustion chamber comprising a plurality of compartments divided at random by a plurality of perforated mixing plates at least one of which consists of a consumable or a test material. In operation a liquid oxidizer and fuel which are hypergolic upon contact are fed into the rocket chamber and as the combustion gases pass from compartment to compartment mixing of the combustion material occurs so that the effect of the consumable or test material can be equated in terms of measured thrust and specific impulse for assessment in the missile field.

---

The invention described herein may be manufactured and used by or for the Government of the United States of America for governmental purposes without the payment of any royalties thereon or therefor.

The present invention relates to a bipropellant rocket combustion chamber, and to a method for assessment of materials for use in the missile field.

Various methods and devices have been used to test materials for use as rocket missile hardware. One method has been to subject the selected material to the flame of a torch or rocket engine exhaust flame at some distance from the rocket nozzle. Materials thus tested often behave quite differently than when used as a specific part of an actual test motor. Another method has been to fabricate the motor part such as a chamber liner, nozzle, or other part from a variety of materials and make a series of motor firings to help select the best available material. This method often requires special fabrication, more material, with resultant cost increases. The present invention provides a means for testing small quantities of materials in a rocket chamber under actual environmental conditions. The degree to which the material can withstand these actions determine the use to which the material can be put.

It is therefore an object of the present invention to provide a means for economically determining the types of materials which can be used as rocket hardware.

Another object is to provide a system for rocket motor materials assessment under actual environmental conditions to determine physical and/or chemical characteristics of the materials.

Still another object is to provide a rocket motor engine which achieves higher performance.

Yet another object is to provide a tribrid engine wherein a third material is added to the exhaust stream to tailor the exhaust velocity.

Other objects and many of the attendant advantages of this invention will be readily appreciated as the same becomes better understood by reference to the following detailed description when considered in connection with the accompanying drawings wherein.

Figure 1:
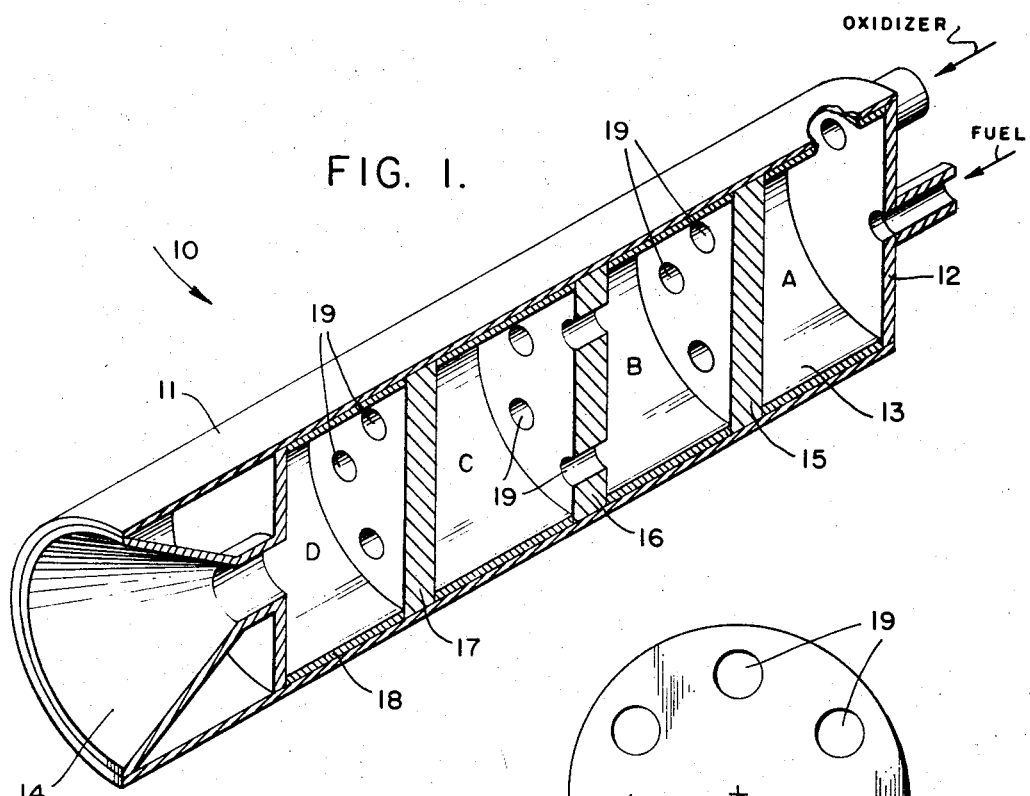
FIG. 1 is a sectional view schematically illustrating a rocket motor incorporating the present invention.

Referring now to the drawings in which like numerals refer to like parts throughout the several views there is shown in FIG. 1 a bipropellant rocket motor 10 which includes a motor casing 11 consisting of metal or other suitable material having at one end an injector face 12 for delivering liquid oxidizer and liquid fuel to combustion chamber 13 from which the combustion products are discharged through nozzle 14. The oxidizer and fuel used are hypergolic. For this embodiment the combustion chamber was divided into four sectors or compartments A, B, C, and D by partitions or plates 15, 16 and 17 which were held in position in said chamber by graphite sleeves which also function as the chamber liner 18. The partitions are in the form of circular disks and have a plurality of symmetrically spaced perforations 19 extending therethrough. The intermingled fuel and oxidizer mixture after combustion pass for further mixing from sector A to B to C to D and finally out through nozzle 14. The partitions are positioned in chamber 13 so that perforations 19 are out of alignment with each. This prevents a straight-line flow of combustion gases from sector to sector. Such an arrangement of the partitions causes turbulence which aids in better mixing of the combustion gases.

Partitions 16 and 17 are made of dense graphite or other materials such as phenolic resin, generally considered to be nonconsumable. Partition 15 is composed of the test material.

Figure 2:
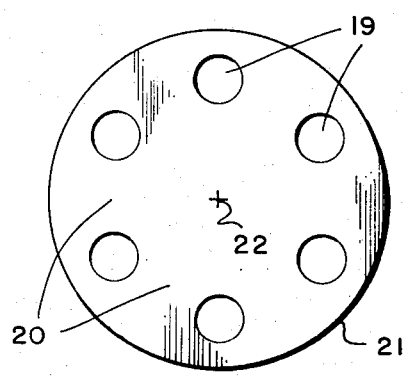
FIG. 2 is a perspective view of a perforated partition or plate.

A preferred design of the partitions or plates shown in FIG. 2 is in the form of a circular disk provided with a plurality of equally spaced perforations 19 separated by thin web sections 20 having cooler outer shell 21 and a large heat sink 22. These partitions may be constructed to fit into a rocket combustion chamber at any designated station along the cylindrical section of the combustion chamber. They were perforated wtih six holes equally spaced on a circle. This leaves a large target area or heat sink 22 along the center of the chamber axis which blocks a direct exit through to nozzle 14.

The partitions or plates used for assessment purposes herein were made of a variety of test materials. The graphite or essentially nonconsumable partitions, 16 and 17 were placed downstream from partition 15, composed of the test material. The bipropellants used were hypergolic or self-igniting upon making contact with each other. These propellants do not need a mixing chamber or ignition chamber to assure ignition before entrance into the combustion chamber. The present invention provides a method of holding the solid test material in the form of a perforated partition or plate in the rocket motor combustion chamber where it is possible to consume, ablate, corrode or erode the material. Flame temperatures are high, approximately 7900° F. at 1000 p.s.i.a. The plurality of sectors or compartments downstream assure proper mixing of the combustible materials and the retention of large particles from passing through which might plug the nozzle throat. These sectors or compartments also provide adequate mixing so that the combustion of solid metals, plastics and other materials can be consumed and the effect of such addition equated in terms of measured thrust and specific impulse. The volume of the individual sectors can be varied by proper placement of the partitions. Studies thus far indicate that the variation of the volumes of the individual compartments or sectors is not as critical as the number of compartments required to ensure maximum performance. To insure maximum performance it was discovered that three compartments or a minimum of two partitions are required downstream from the partition composed of the test material. In other words, three partitions forming four sectors or compartments are the minimum, since at least one partition is of a consumable or test material. The perforated partitions should be rotated so that the web section between the holes will be positioned directly across the center of the perforations in the partition downstream from it. This improves the mixing process of the combustion products.

In operation of the described device the liquid oxidizer and fuel, which are hypergolic upon contact with each other, are fed into the rocket motor chamber from injector 12. The combustion gases from sector A pass through partition 15 consisting of the test material, then progress through the other partitions and compartments and finally out through the exit nozzle. Chunks from the test material were consumed without plugging the perforations in the partition. Tests were made with three of the six perforations of one partition plugged without causing any operational difficulties or reduction in rocket motor performance.

The nonconsumable partitions or plates help to mix the products of combustion from the consumable partition with the combustion products of the bipropellants. Multiple nonconsumable partitions further served the function of increasing combustion efficiencies of the injector propellant mixing. Performances of liquid propellant gels containing metal powders were increased 12% by positioning a nonconsumable perforated partition in the combustion chamber. The addition of two such partitions caused a further increase of 6% over propellant performance using the single plate, or an overall increase of 18% in propellant performance over a chamber employing no partitions.

Nonconsumable graphite partitions were used in repeat test firings of approximately five seconds duration up to 60 seconds cumulative firing time and continuously for 25 seconds. The partitions proved very satisfactory and were used in both the rocket engines wherein the test materials partition was used to evaluate materials for rocket use and in engines to evaluate the performance of liquid propellants and liquid propellant gelled slurries.

The materials tested were first formed into a partition of the same design as the graphite or nonconsumable plates used herein. Such materials as polyethylene, methyl methacrylate, silicon carbide foam, fire brick, lava, asbestos phenolic, transite, magnesium, aluminum, steel and copper were tested. The firing time for all the tests was 3.9 seconds. The fuel in the motor was hydrazine and the oxidizer was chlorine trifluoride. Table I below is a summary of the results of the materials used in their assessment for use as a rocket and/or missile materials under actual rocket firing conditions.

The extent of flame coloration during testing was an indicator as to how well the test material plate was surviving. These tests demonstrated some of the versatility of the material in the form of combustion chamber partitions including possible uses. This technique could find use in studies of radar attenuation and emitted radiation or other uses where additives to the exhaust are desired. The material of a consumable partition or plate, consumed on ignition, could very well be a solid propellant such as used in a hybrid motor. Proper design of the burn area would allow linear mass addition for the boost phase until depletion.

The test materials can be grouped into three general categories: (1) a material that ablates or is consumed for a purpose other than aiding thrust; (2) a material that reacts with and is consumed by the propellants with the intent of increasing thrust and/or performance; and (3) a material that remains intact for use as a plate, liner, nozzle or other hardware. The first category includes materials such as polyethylene and methyl methacrylate; the second category includes mostly metals; and the third category includes graphite, asbestos phenolic, silicon carbide, fire brick and possibly lava.

Figure 3:
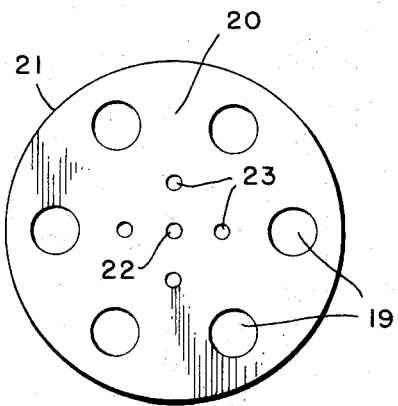
FIG. 3 is a section of a modified partition or plate wherein the heat sink area shown in FIG. 3 is perforated on one face.

A modification of the partitions as shown in FIG. 3 with a series of holes in the heat sink area on the downstream side only provides an augmented thrust or an addition of materials to the exhaust stream. It also lends itself to the formation of an aerodynamic spike nozzle. Since the position of the partitions in the combustion chamber can be diversified on one shape is optimum for all conditions. Different perforation sizes for the exhaust gases to pass through, location, or shape such as canted perforations may be required. The partitions may be of varying thicknesses. In some instances where the supply of test material is scarce, the material may be embedded in the heat sink area of the partition. The L* (chamber volume divided by nozzle throat area) of the test chamber can be varied by changing the internal diameter of the chamber lining or by changing the thickness of the partitions.

The partitions used in the present invention were cylindrical disks three inches in diameter and 1.5 inches in length to fit the combustion chamber at any designated station along its interior. They were perforated with six 0.5 inch diameter holes equally spaced on a circle whose diameter was 1.625 inches. This left a large target area or heat sink along the center of the chamber axis which blocks a direct flow through the nozzle. The partitions may be made with the central portion or heat sink area in a cupped form. This cupped depression does not appear necessary except for providing great flexibility in the use of the partitions or plates. Partitions with the cupped center can be stacked next to each other and can be used TABLE I.—DATA SUMMARY OF CONSUMABLE TEST MATERIAL WITH CHLORINE TRIFLUORIDE AND HYDRAZINE [a]

| Test Materials | Consumed, lbs. | Percent of Test Material in Fuel [b] | O/F | $I_{sp}$, lb. f-sec. / lb. m | $I_{sp}$, gm.-sec. cc. | $c^*$, ft. / sec. | Comments and Flame Color |
|---|---|---|---|---|---|---|---|
| None | | | 2.18 | 249 | 356 | 5,768 | Clear blue flame. |
| Polyethylene | .176 | 1.4 | 2.06 | 238 | 338 | 5,617 | Yellow flame, carbon deposit on residue. |
| Methyl Methacrylate | .231 | 1.3 | 1.54 | 206 | 280 | 5,628 | Do. |
| Silicon Carbide Foam | .026 | 2.3 | 1.98 | 245 | 345 | 5,877 | Clear blue flame, white deposit on residue. |
| Fire Brick | .104 | 9.0 | 2.07 | 240 | 346 | 5,800 | Lavender flame, grey slag deposit. |
| Lava | .225 | | | | | | Injector burned out. |
| Asbestos Phenolic | .088 | 10.3 | 3.05 | 227 | 347 | 5,214 | Slight yellow flame, disk still intact but charred. |
| Transite | .267 | 24.4 | 2.41 | 217 | 332 | 5,396 | Red flame, center body pieces loose but still in chamber. |
| Magnesium | .370 | 30.9 | 1.92 | 225 | 338 | 5,456 | White flame. |
| Aluminum | .258 | 27.4 | 1.98 | 235 | 362 | 5,474 | Do. |
| Steel, 1020 | .214 | 19.9 | 2.18 | 217 | 339 | 5,313 | Clear to yellow flame, flush cloud looked like rust. |
| Copper | .507 | 31.5 | 1.50 | 192 | 309 | 4,700 | Red flame. |

[a] All calculations except the oxidizer to fuel weight ratio include the weight loss of the test material as being additional propellant burned. The firing time for all tests was 3.9 seconds.
[b] Percent of total nonoxidizer material.

as water cooled plates if made from mild steel or copper or other suitable material.

The partitions were modified by adding a series of five perforations to the side which is to be positioned downstream in the combustion chamber. The modified partition when used in the combustion chamber provided with means for running a third liquid or gases component through these added holes augmented the thrust by adding a third material. This caused aerodynamic or spike nozzle effect.

Work in magnetohydrodynamics could apply the present concept of mixing partitions or plates in a combustion chamber for collecting an electric current from combustion gases in the chamber rather than from the nozzle end of the rocket.

The use of consumable materials has several possible uses such as the addition of dense materials for missile boost conditions or as an aid to photographing from a distance the ignition of a round where the exhaust is normally transparent.

Obviously many modifications and variations of the present invention are possible in the light of the above teachings. It is therefore to be understood that within the scope of the appended claims the invention may be practiced otherwise than as specifically described.

What is claimed is:

1. A bipropellant rocket combustion chamber comprising
    an enclosing casing
    at least three partition means positioned at random in said casing for separating said chamber into a series of sectors;
    an injector mounted at the head end of said casing for feeding liquid bipropellants into said chamber; and
    an exhaust nozzle postioned at the aft end for release of combustion products;
    each of said means being provided with a plurality of perforations to permit the passage of combustion products from sector to sector and arranged in said chamber so that said perforations are out of alignment with each other thereby permitting better mixing of the combustion products; and at least one of said partition means consisting of an essentially consumable material and the remaining partition means consisting of an essentially nonconsumable material.

2. The combustion chamber of claim 1 in which the nonconsumable partitions are positioned downstream from said consumable partition.

3. The combustion chamber of claim 1 in which the nonconsumable material consists of graphite and the consumable material consists of a member selected from the group consisting of polyethylene, methyl methacrylate, fire brick, lava, transite, magnesium, aluminum, steel and copper.

4. The combustion chamber of claim 2 in which the nonconsumable partitions are provided with a plurality of perforations equally spaced in a circle and a plurality of perforations of smaller size located in the central portion of said partition on the side facing downstream.

References Cited
UNITED STATES PATENTS

| | | | |
|---|---|---|---|
| 2,532,709 | 12/1950 | Goddard. | |
| 2,551,115 | 5/1951 | Goddard. | |
| 3,174,283 | 3/1965 | Crocco | 60—258 |
| 3,242,668 | 3/1966 | Ellis | 60—39.72 |
| 3,310,950 | 3/1967 | Matthews | 60—258 |

CARLTON R. CROYLE, *Primary Examiner.*

MARK M. NEWMAN, *Examiner.*

D. HART, *Assistant Examiner.*